Dec. 17, 1929.  G. E. FOERSTNER  1,740,082
MOLDING METHOD AND APPARATUS
Filed April 6, 1928   2 Sheets-Sheet 1

Inventor
George E. Foerstner
By Pierson, Eakin & Avery
Attys.

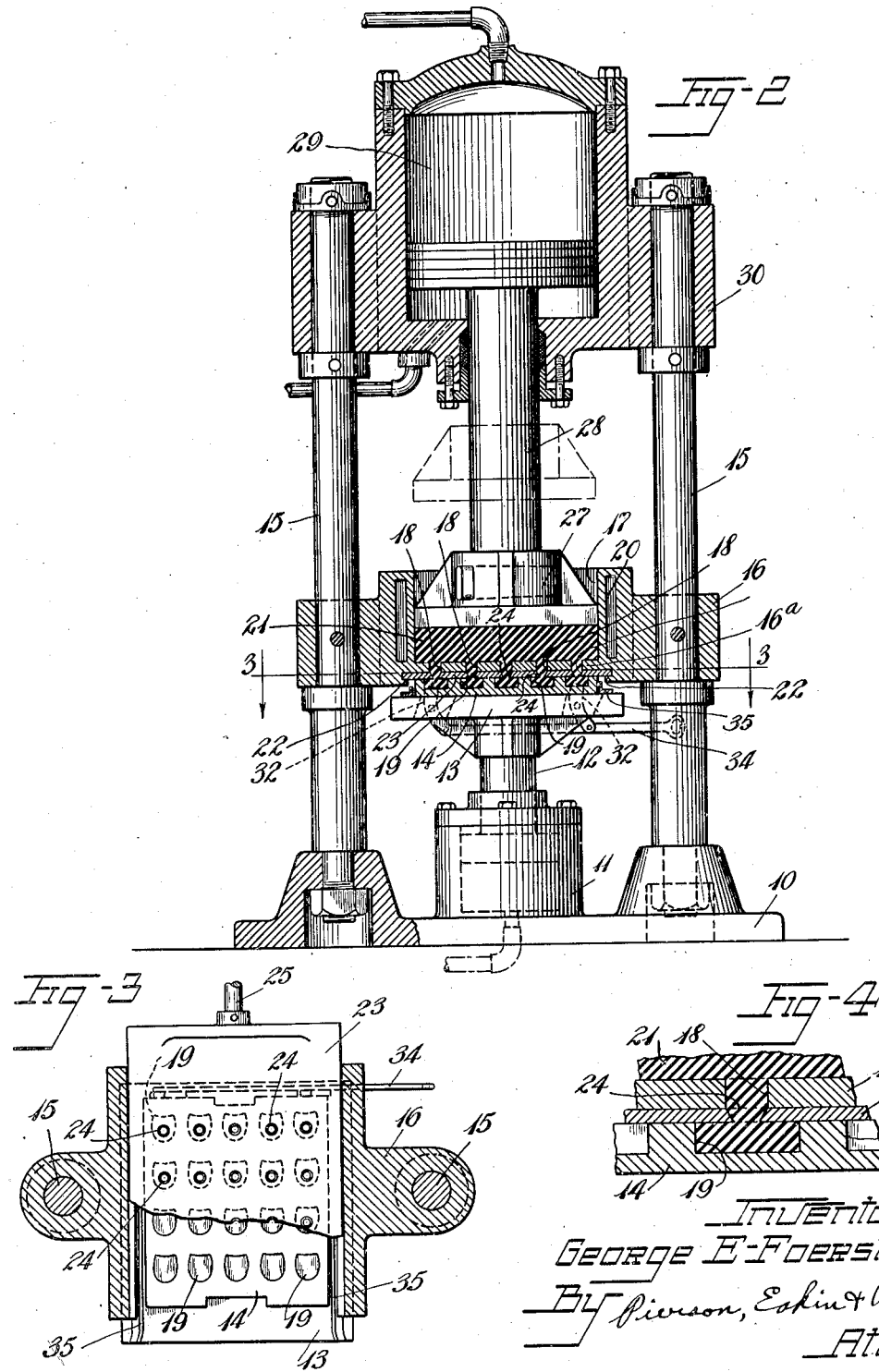

Patented Dec. 17, 1929

1,740,082

UNITED STATES PATENT OFFICE

GEORGE E. FOERSTNER, OF AKRON, OHIO, ASSIGNOR TO THE B. F. GOODRICH COMPANY, OF NEW YORK, N. Y., A CORPORATION OF NEW YORK

MOLDING METHOD AND APPARATUS

Application filed April 6, 1928. Serial No. 267,892.

This invention relates to procedure and apparatus for molding plastic material by the extrusion method and especially for molding small articles, such as rubber shoe-heels or small porcelain articles such as electric insulators, in large numbers. Heretofore articles such as shoe-heels have been molded of rubber composition by moving a multiple-cavity mold past the delivery aperture of an extrusion device in stock-receiving relation thereto, the stock forced into each cavity being sheared off from the supply mass of stock at the mouth of the cavity as an incident of the cavity passing out of communication with the delivery aperture. In such procedure each cavity has been filled progressively from one side thereof to the other, the movement of the mold being continuous for the filling of a succession of the cavities therein, and the flow of the stock into the cavity consequently has not been symmetrical with relation thereto, which may unfavorably affect the grain characteristics of the stock, or the mold has been intermittently moved and stopped with one after another of a file of cavities in communication with the extrusion aperture, which has required a relatively long time for the filling of the multiple-cavity mold.

My chief objects are to provide for symmetrical flow of the stock into each mold cavity, to provide economy of time in the filling of a multiple-cavity mold, and, in apparatus including an extrusion device constructed for complete enclosure and high compression of the supply mass of stock, to provide conveniently for the accommodation of a large supply mass of stock and thus to avoid the necessity of frequent opening and refilling of the extrusion device.

A further object is to provide a tight seal between the mold and the extrusion device and thus to avoid wasteful escape of stock.

Of the accompanying drawings:

Fig. 2 is a section of the same on line 2—2 of Fig. 1.

Fig. 3 is a section on line 3—3 of Fig. 2.

Fig. 4 is a fragmentary vertical section on a larger scale of parts of the apparatus in the vicinity of one of the extrusion apertures.

Figure 1:
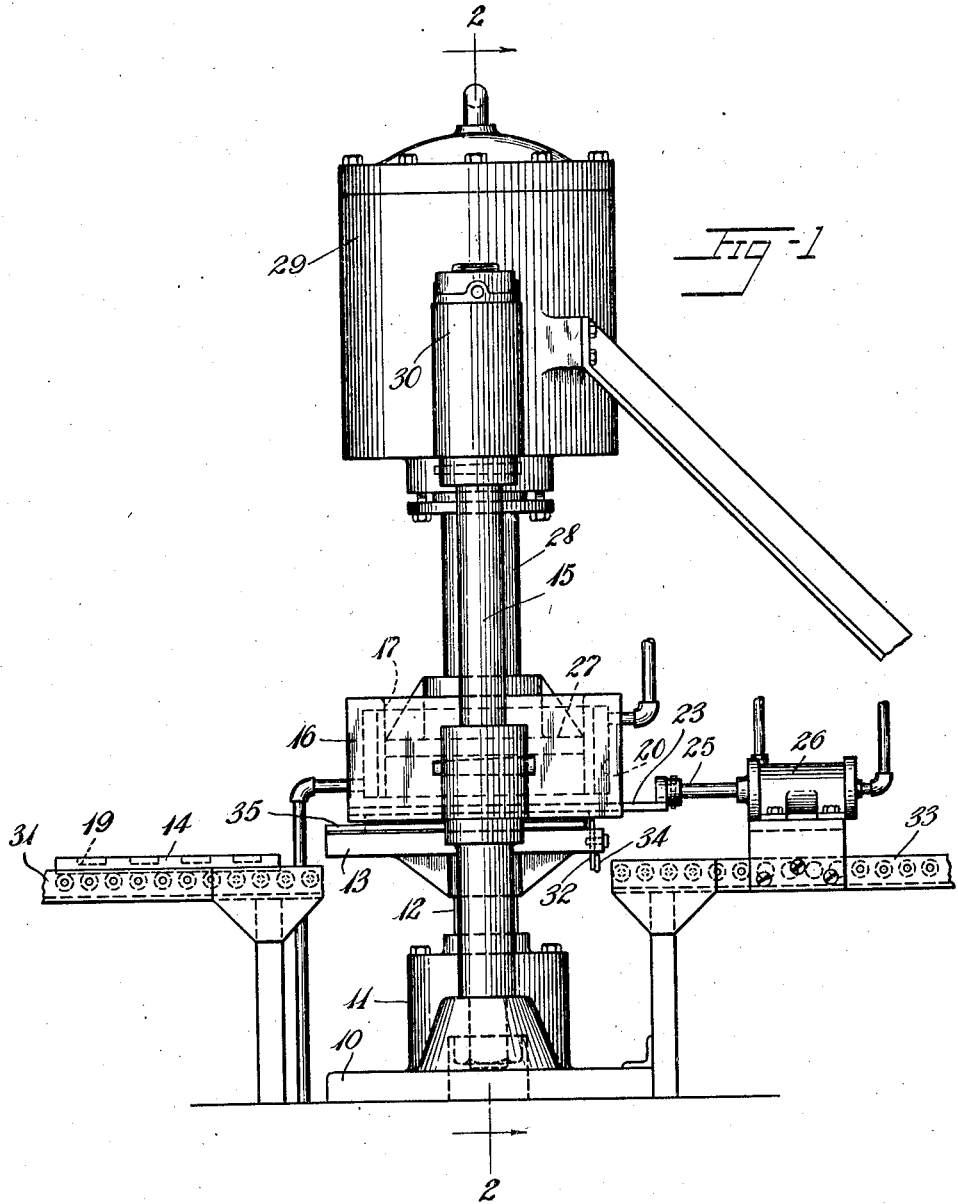
Fig. 1 is a side elevation of apparatus embodying and adapted to carry out my invention in its preferred form.

Referring to the drawings, the apparatus comprises a base 10 centrally formed with a ram cylinder 11 is which is mounted an upwardly projecting ram 12 having secured on its upper end a supporting and guiding head 13 for a multiple-cavity mold 14.

A pair of standards 15, 15 rise from the respective sides of the base 10. At a position intermediate of their height they are connected by a steam jacket, extrusion chamber casting 16 which is centrally formed with an upwardly opening extrusion chamber 17 having a floor 16ª formed with numerous extrusion apertures such as the apertures 18, 18 so spaced apart as to be in registry with respective cavities such as the cavities 19, 19 of the mold 14 when the latter is properly positioned upon the ram head 13 and held upward against the extrusion chamber assembly. The extrusion chamber casting 16 when adapted for extrusion of a heat-plastic substance such as an unvulcanized rubber composition is preferably formed with a steam passage 20 surrounding the extrusion chamber for the circulation of steam through the casting to keep in a highly plastic condition a supply mass of rubber composition 21 contained in the chamber.

On its lower side the extrusion chamber casting 16 is formed at opposite sides with undercut flanges 22, 22 defining guide ways for respective side margins of a die, shearing and closure plate 23 which is formed with downwardly tapered apertures such as the apertures 24, 24 each being at the upper face of the plate the same size as the aperture 18 in the extrusion chamber floor 16ª and at the lower face of the plate being of small size as compared with the size of the mold cavity 19, so that when the plate 23 is moved into a position such that its apertures 24 are in registry with the respective apertures 18 and the respective mold cavities 19, the extrusion chamber 17 will have communication with all of the mold cavities through open passages, 18, 24, terminating in comparatively small mouths centrally located with relation to the respective mold cavities, so that a flow of stock from the extrusion chamber 17 into each of the mold cavities will be symmetrical with relation to the mold cavity and will progressively fill the mold cavity by substantially symmetrical extension of the stock within the cavity in all directions from its center.

For sliding the shearing plate 23 in its guide ways to register its apertures with the apertures 18 and alternately to move the plate out of registry with the extrusion apertures and thus to shear off from the supply mass 21 the stock contained within the mold cavities 19 and at the same time close the apertures 18, the plate 23 is secured at the end of the piston rod 25 of a horizontal double-acting fluid pressure cylinder 26 adapted forcibly to effect the reciprocal movement of the plate although the plate may be tightly gripped between the floor 16ª of the extrusion chamber and the mold 14 under the force of the ram 12.

The means for forcing the plastic stock 21 from the chamber 17 through the die apertures comprises a plunger or ram head 27 slidably fitting in the chamber 17 and secured upon the lower end of the piston rod 28 of a double-acting fluid pressure cylinder 29 formed in a casting 30 secured to and connecting the upper ends of the standards 15.

A conveyor 31 is provided for delivering successive molds such as the mold 14 onto the ram head 13 and a stop device comprising a pair of stop arms 32, 32 pivoted on the ram head 13 is provided for accurately positioning the successive molds upon the ram head. The stop arms 32 are turnable about their pivots to positions such that they lie entirely below the upper face of the ram head 13, to permit the mold to be shoved from the ram head onto a receiving conveyor 33, and for turning the stop arms their lower ends are pivoted to a handle rod 34.

Guide rails 35, 35 are secured upon the upper face of the ram head 13 for accurately positioning the successive molds 14 with relation to the extrusion device and for guiding the molds from the ram head onto the receiving conveyor 33.

In the operation of the apparatus, the extrusion chamber 17 being charged with the supply mass of plastic 21 and the shearing and closure plate 23 being positioned with its apertures 24 out of registry with the apertures 18 of the extrusion chamber floor and the ram 12 being lowered, one of the molds 14 is shoved from the delivery conveyor 31 onto the ram head and is positioned thereon between the guide rails 35 and against the stop arms 32. The ram 12 is then raised to present the mold to and hold it pressed against the under face of the shear plate 23. The shear plate is then moved by means of the fluid pressure cylinder 26 to bring its apertures in registry with those of the extrusion chamber and the extrusion ram 27 is forced downward, causing stock to flow from the supply mass 21 simultaneously into the several mold cavities 19 to fill the same. When the mold cavities are filled and preferably while the stock therein is held under high pressure by the force of the extrusion ram 28, the plate 23 is moved out of registry with the apertures 18 of the extrusion chamber, by reversal of the fluid pressure cylinder 26, such movement of the plate 23 closing off the extrusion passages 18 and shearing off from the supply mass of stock and from the stock in the apertures of the plate 23, the stock held under compression in the mold cavities. It is not entirely essential, however, that high pressure be maintained upon either the extrusion ram 28 or the mold-lifting ram 12 during such movement of the plate 23 or during the reverse movement of the said plate, the stock initially having been thoroughly compressed in the mold cavities, and consequently the apparatus may be so operated that the shearing action of the plate 23 is effected without requiring a very great force, although the mold is very forcibly held against the plate 23 during the mold-filling flow of stock so that leakage or overflow of the stock from the mold cavities is avoided.

When the mold has been filled and the stock in its several cavities has thus been sheared off from the supply mass and the outlets from the extrusion chamber 17 have been closed by the plate 23, the ram 12 is lowered and the mold is shoved therefrom onto the receiving conveyor 33, and the operation as described is repeated with successive molds.

Modifications are possible within the scope of my invention as defined in the appended claims.

I claim:

1. The method of molding plastic material which comprises concurrently forcing stock from a single supply mass by extrusion into a plurality of mold cavities and, while holding the stock under pressure in the several cavities by pressure applied to the supply mass, shearing off from the supply mass the masses of stock within the respective cavities, the supply mass as a whole being held in substantially the same position with relation to the mold throughout the filling of the mold cavities and throughout the shearing off operation.

2. Molding apparatus comprising an extrusion chamber formed with an extrusion aperture in a wall thereof, a shear plate mounted against the outer face of said wall and formed with an extrusion aperture, the plate being slidable with relation to said wall to effect registry and non-registry of the two said extrusion apertures with each other, a cavitied mold, and means for holding the mold with its cavity in stock-receiving relation to the extrusion aperture of the plate.

3. Molding apparatus comprising an extrusion chamber formed with an extrusion aperture in a wall thereof, a shear plate mounted against the outer face of said wall and formed with an extrusion aperture, the plate being slidable with relation to said wall to effect registry and non-registry of the two said extrusion apertures with each other, a cavitied mold, and means for holding the mold against the plate with variable pressure and with the cavity of the mold in stock-receiving relation to the extrusion aperture of the plate.

In witness whereof I have hereunto set my hand this 30th day of March, 1928.

GEORGE E. FOERSTNER.